United States Patent [19]

Passerell et al.

[11] Patent Number: 4,712,813
[45] Date of Patent: Dec. 15, 1987

[54] COUPLING APPARATUS
[75] Inventors: David P. Passerell, Geneva; Danny G. Rogge, Dorset, both of Ohio
[73] Assignee: Perfection Corporation, Madison, Ohio
[21] Appl. No.: 924,050
[22] Filed: Oct. 28, 1986
[51] Int. Cl.[4] .............................................. F16L 33/18
[52] U.S. Cl. .................................... 285/250; 285/323; 285/351
[58] Field of Search ............... 285/323, 250, 351, 242, 285/249, 255

[56] References Cited
U.S. PATENT DOCUMENTS 4,229,025 10/1980 Volgstadt ........................ 285/323 X
4,407,526 10/1983 Cicenas ............................ 285/323 X
4,445,714 5/1984 Kisiel .............................. 285/323 X Primary Examiner—Dave W. Arola
Attorney, Agent, or Firm—Fay, Sharpe, Beall, Fagan, Minnich & McKee

[57] ABSTRACT

A stab-type coupling apparatus adapted to receive an associated pipe end in a body thereof and prevent its withdrawal therefrom. The coupling apparatus includes an elongated hollow stiffener received in a coupling body recess and providing internal support for the associated pipe end. A retaining ring retained between the body and stiffener has a radially inward extending toothed portion that grippingly engages the external surface of the associated pipe end. A seal means is disposed on an axially inner side of a collet retainer to seal along a peripheral portion of the pipe end. The collet retainer includes a toothed internal surface that selectively engages the pipe end during attempted withdrawal from the coupling body. A generally frustoconical member cams the collet retainer into gripping engagement with the pipe end. A gasket is radially and axially compressed at an outer end of the recess and disposed on an opposite side of the collet retainer from the seal means. A nipple is adapted to compress the gasket and prevent ingress of dirt and moisture to the coupling body. The retaining ring toothed surface has an inner diametrical dimension slightly less than a second diametrical dimension defined by the toothed surface of the collet retainer. Attempted withdrawal of the pipe end is thereby initially resisted by the retaining ring and further withdrawal forces are opposed by the collet retainer.

15 Claims, 6 Drawing Figures

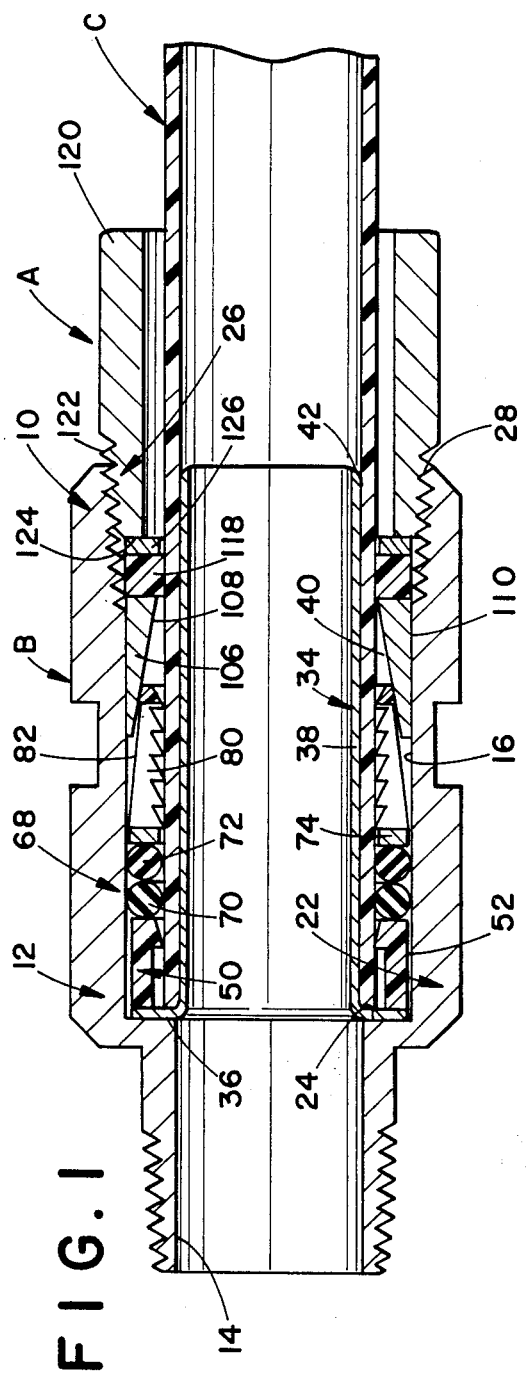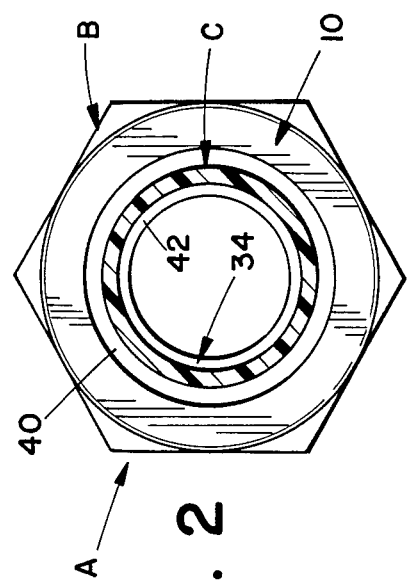

COUPLING APPARATUS

BACKGROUND OF THE INVENTION

This invention pertains to the art of couplings and, more particularly, to stab-type couplings.

The invention is particularly applicable to a coupling apparatus in which a non-metallic pipe or tube end is received in the apparatus by simply pushing or thrusting the pipe end therein. The pipe end is gripped along an exterior surface by the coupling which resists attempted withdrawal. The invention is particularly applicable to a plastic pipe as utilized in the natural gas industry and will be described with particular reference thereto. However, it will be appreciated that the invention has broader applications and may be advantageously employed in other environments and applications.

A typical stab-type coupling is well known in the art. These types of couplings are designed to facilitate ease of installation so that one end of a smooth wall plastic pipe, such as is widely used in the natural gas industry, is severed and simply inserted into the coupling body. No detailed machining or aligning steps are necessary and recent advents in the art have provided a secure coupling arrangement. Nevertheless, a potential problem exists with these type of prior art couplings. There is an extremely remote possibility that slow removal of an inserted plastic pipe into the coupling body can proceed without the gripping portions of the coupling apparatus actively and grippingly engaging the pipe end.

Yet another remote potential exists that a leak path may be established along an exterior surface of the plastic pipe. It is believed that a dimple may be formed in the exterior surface of the pipe due to the creep associated with plastic elements. More specifically, imposition of extreme forces on an external surface of the pipe can leave a dimple or identation therein. If this dimple or identation is positioned adjacent a cut end of the pipe, such as received in the coupling body, the potential exists for a leak path to be established therearound.

U.S. Pat. No. 4,229,025, issued to Volgstadt, et al. on Oct. 21, 1980, illustrates one stab-type coupling. In that arrangement, a spacer ring cooperates with a retaining ring of metallic construction adjacent a flange portion of a hollow stiffener. Additionally, a flexible flange extends inwardly from an outer end of the body to define a cover that prohibits entry of dirt and moisture into the interior of the coupling body. An alternate arrangement of this cover employs a plastic sleeve in conjunction with an O-ring seal.

On the other hand, U.S. Pat. No. 4,445,714, issued to Kisiel, III, on May 1, 1984 illustrates a coupling arrangement in which a spacer retainer ring is interposed between a radially outward extending flange of the hollow stiffener and the retaining collet. This embodiment utilizes a gasket disposed axially outward of the collet for operative engagement with a threaded nut. Inward movement of the nut is designed to apply sealing pressure on the gasket and urge engagement between the collet and locking ring. This type of construction suffers from the absence of a seal located inwardly of the collet for sealing engagement with an external surface of an inserted plastic pipe.

With the foregoing in mind, it is an object of the present invention to provide a new and improved coupling which improves on these prior designs and provides a simple, reliable, and economical coupling apparatus.

SUMMARY OF THE INVENTION

This invention provides for an improved coupling apparatus that is utilized for interconnecting a smooth wall non-metallic pipe end to a service box or the like.

According to a more limited aspect of the invention, the coupling apparatus includes a body having a recess defined therein. A hollow stiffener is received in the recess and has a reduced peripheral dimension for defining an annular cavity with the body. A first elastomeric seal member is received in the cavity and adapted for sealing engagement between the body and an associated non-metallic pipe end. Further, a collet retainer is disposed in the recess between the seal member and the outer end of the recess. The collet retainer is designed for selective gripping engagement with an external surface of the associated non-metallic pipe end. A gasket is disposed in the recess outer end and adapted for compression and sealing engagement with the non-metallic pipe end.

According to another aspect of the invention, the coupling apparatus further includes a retaining ring received in the recess adjacent the inner end thereof.

According to yet another aspect of the invention, a nipple is threadedly received in the recess outer end for operative, compressing engagement with the gasket.

According to still another aspect of the invention, a thrust washer and second seal member are interposed between the first seal member and the retaining collet.

A principal advantage of the invention is found in the enhanced sealing arrangement with a non-metallic pipe end.

A further advantage of the invention resides in eliminating the potential for slow removal of a pipe end once it is inserted into the coupling apparatus.

Yet another advantage of the invention is found in the axial spacing of the seal member and gasket on opposed sides of the retaining collet.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is a vertical cross-sectional view of an assembled coupling apparatus formed in accordance with the subject invention;

FIG. 2 is an elevational end view of the coupling apparatus of FIG. 1 with the nipple removed therefrom;

DETAILED DESCRIPTION OF THE PREFERRED EMBODIMENT

Figure 3:
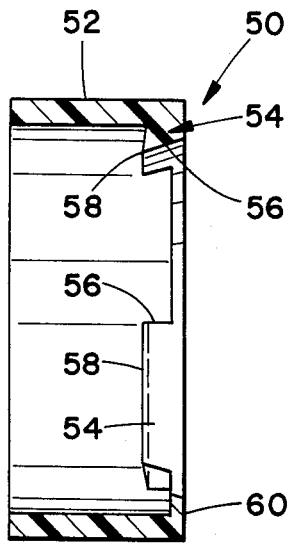
FIG. 3 is a vertical cross-sectional view of the retaining ring formed in accordance with the subject invention.

Referring now to the drawings, wherein the showings are for purposes of illustrating the preferred embodiment of the invention only and not for purposes of limiting same, the FIGURES show a coupling apparatus A including a coupling body B adapted to receive an associated smooth wall non-metallic pipe end C therein. The body is adapted to receive the pipe end by means of a simple manual insertion. The coupling apparatus is designed to grippingly engage the pipe end to inhibit removal once inserted and oppose any attempted withdrawal of the associated non-metallic pipe end.

More specifically, the coupling body B formed of a suitable metal includes a first end 10 and an axially opposed second end 12. A first bore or passage 14 extends axially inward from the second end and communicates with an associated member, such as a metering box or the like (not shown). An enlarged recess or counterbore 16 extends axially inward from the first end of the coupling body. This recess is of generally constant dimension and terminates intermediate the first and second ends of the body.

A first or inner end 22 of the recess is defined adjacent a radial shoulder 24 at the intersection of the passage 14 and recess 16. A second or outer end 26 of the recess includes an interior threaded portion 28 extending axially inward a limited dimension from the first end 10 of the body.

An elongated, hollow stiffener 34 includes a radially outward extending flange 36 at one end thereof. As shown in FIG. 1, the flange 36 is designed for abutting engagement with radial shoulder 24. The remainder, reduced diameter portion 38 of the stiffener has a peripheral dimension substantially less than the recess so as to define an annular cavity 40 therebetween. The reduced diameter portion 38 is of a preselected dimension adapted for close, supporting receipt within the non-metallic pipe end C. Preferably, the stiffener is formed from a zinc plate dichromate or like material that provides rigid, internal support to the pipe end. Further, the opposed end 42 has a smooth chamfer to facilitate receipt of the pipe end thereover.

Figure 4:
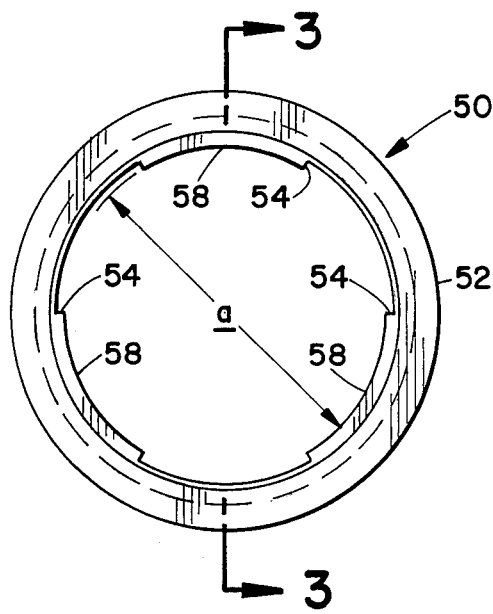
FIG. 4 is an end view taken along the right-hand side of the retaining ring of FIG. 3.

With continued reference to FIG. 1, and additional reference to FIGS. 3 and 4, a retaining ring 50 will be described in greater detail. The retaining ring is preferably constructed of an acetyl copolymer or like material. It has a generally cylindrical configuration and a smooth exterior wall 52 that is freely received within the recess 16 for relative movement with respect to the body. Radially inward extending toothed portions 54 are circumferentially spaced along selected inner arcuate portions of the retaining ring. The toothed portions have a radially and axially inward frustoconical surface 56 that terminates in a sharp edge 58 adapted for gripping engagement with an external surface of the pipe end. The reduced dimension a defined diametrically between these sharp edges is preselected for a purpose and function to be further described hereinbelow. The disposition of the frustoconical surface 56 facilitates receipt of the pipe end during insertion and also prohibits removal of same.

An outer end 60 of the retaining ring is designed for abutting engagement with a seal means 68. According to the preferred embodiment, the seal means comprises first and second seal members 70, 72 typically formed as elastomeric O-rings. The seal means must be immune to attack from material normally found in natural gas such as liquid hydrocarbons, odorants, carbon dioxide, and water. The O-rings are dimensioned so as to be radially compressed in the annular cavity 40 between the pipe end C and the recess 16 of the body. The seal means provides a positive sealing engagement with the pipe end at an area adjacent the inner end 22 of the recess. As illustrated, the first and second seal members 70, 72 abuttingly engage one another in the axial direction, although it will understood by those skilled in the art that a spacer (not shown) may be positioned therebetween.

Continuing axially outward from the seal means 68 and toward the body first end 10, a thrust washer 74 abuttingly engages the seal means 68. The washer prevents movement of the seal means toward a collet retainer 80. In a preferred embodiment, the thrust washer has been constructed from a high density polyethylene material, although materials exhibiting similar properties may be used with equal success.

Figure 5:
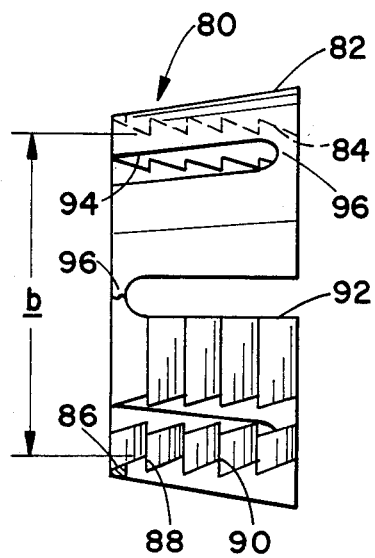
FIG. 5 is a generally vertical, partial cross-sectional view of the collet retainer formed in accordance with the subject invention; and, FIG. 6 is an end view taken along the right-hand side of the collet retainer of FIG. 5.
Figure 6:
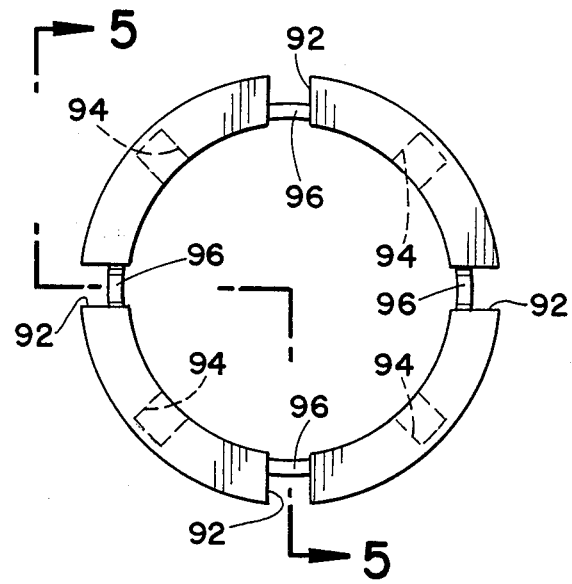

As best seen in FIGS. 5 and 6, the collet retainer 80 is provided with a tapered external surface 82 which converges in the direction of the first end 10 of the coupling body. The interior of the collet retainer has a generally toothed or serrated surface generally designated 84. In fact, as is apparent in FIG. 5, the toothed surface is defined by a plurality of inclined ramp surfaces 86 which diverge in the direction of the first end 10 of the coupling body. Radially extending surfaces 88 interrupt the ramp surfaces to define sharp, pointed edges 90 for gripping engagement with an exterior surface of the associated pipe end C.

The collet retainer is adapted for limited flexing movement by means of longitudinally extending recesses 92, 94. The recesses 94 open toward the first end 10 of the coupling body while recesses 92 are open toward the second end 12. As is apparent, the recesses do not extend completely through the collet retainer in the axial direction but instead have interconnecting portions 96 that maintain the circumferential integrity of the collet retainer. Further, the collet retainer has been advantageously constructed from a suitable acetyl copolymer that exhibits durability and the requisite flexibility.

The collet retainer is adapted for cooperative engagement with a generally frustoconical ring 106. The ring has an internal tapered surface 108 that selectively and matingly engages the external tapered surface 82 of the collet retainer. The frustoconical ring converges inwardly as it extends axially toward the first end 10 of the coupling body. This, of course, aligns the tapered surfaces 82, 108 for cooperating engagement. The external surface 110 defines a generally smooth-walled cylindrical surface that is received in the recess 16. By constructing the ring from a plate zinc material, the frustoconical ring assures an inward camming movement of the collet retainer.

A gasket 118 of generally annular configuration is received in axially abutting engagement with the outer end of the frustoconical ring. It has an internal dimension for closely receiving the external surface of an associated pipe end. As will become more apparent hereinbelow, the gasket is adapted for an axial and radial compression so that it sealingly engages the external surface of the pipe end.

A nipple 120 includes an externally threaded region 122 that cooperates with threaded portion 28 of the coupling body. Relative rotation between these members axially advances the nipple into the recess 16 so that an inner end or shoulder 124 engages the gasket 118. The gasket is therby axially compressed between shoulder 124 and the frustoconical ring 106. This axial compression, in turn, results in a radial compression of the gasket 118 between the body B and associated pipe end C which limits ingress of moisture, dirt and the like into the recess.

An important feature of the subject invention resides in the relative dimensions of the diametrical dimension defined between the sharp edges 58 of the retaining ring and the diametrical dimension between the sharp edges 90 of the collet retainer. The retaining ring dimension a is somewhat less than the dimension b of the collet retainer. In this manner, the initial gripping engagement with the external surface of an associated pipe end is achieved at the retaining ring. This prevents slow withdrawal of an inserted pipe end.

More specifically, a pipe end C is axially inserted through the nipple 120 and into the annular cavity 40 defined between the hollow stiffener and recess 16. The innermost end of the pipe end abuttingly engages or nearly engages the radially outward extending flange 36 of the stiffener. The stiffener provides an internal support for the pipe end while the retaining ring, seal means, collet retainer, frustoconical ring, and gasket engage the external surface of the pipe end and prevent its withdrawal from the coupling body. The sharp edge 58 of the retaining ring is dimensioned to grip the external surface of the pipe end. Thus, any attempted withdrawal of the pipe end will move the retaining ring, seal means, thrust washer, and collet retainer as a unit toward the first end 10 of the coupling body (toward the right as shown in FIG. 1). Movement of the collet retainer relative to the frustoconical ring 106 cams the collet retainer, more particularly the toothed surface 84, radially inward into biting, gripping engagement with the external surface of the pipe end. Therefore, initial withdrawal of the pipe end is prevented by the retaining ring while any additional withdrawal forces are opposed by the collet retainer.

The gasket 118 is designed to eliminate dirt, moisture, and the like from passing axially inward into the recess. As indicated above, the nipple is axially advanced toward the gasket to compressingly engage the gasket against the external surface of the pipe end. A remote possibility exists that the gasket could be so compressed as to leave a dimple or indentation in the periperal portion of the pipe end. This establishes the potential for a leak path to be defined around the pipe end. Nevertheless, and in accordance with the subject invention, the seal means 68 still prevents any leakage of natural gas or the like form the pipe end since it is disposed on the axially inner side of the collet retainer. Thus, the seal means remains unaffected and still provides a positive seal with the external surface of the pipe end.

Also, in an alternate arrangement, provision is made for receipt of a second thrust washer 126 between the gasket 118 and pipe end shoulder 124. Placement of the second thrust washer intermediate the gasket and pipe end allows the gasket to be axially and radially compressed without destructive effect. It will be understood that the coupling apparatus also can function equally well without introduction of the second thrust washer.

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A stab-type coupling apparatus comprising:
   a body having a recess defined therein, said recess having axially spaced inner and outer ends;
   an elongated hollow stiffener received in said recess having an outer peripheral dimension for defining a generally annular cavity with said body, said cavity adapted to receive an associated non-metallic pipe end;
   an elastomeric first seal member received in said recess adjacent said inner end and adapted for sealing engagement between said body and an associated non-metallic pipe end;
   a collet retainer disposed in said recess between said first seal member and recess outer end, said collet retainer having a generally tapered outer surface and a toothed inner surface;
   a ring disposed in said recess having a generally tapered inner surface in facing, conforming relation with said collet retainer outer surface adapted to cam said collet retainer inner surface toward engagement with an associated non-metallic pipe end; and,
   a gasket disposed in said recess between said collet retainer and said recess outer end, said gasket adapted to be compressed toward sealing engagement with an associated non-metallic pipe end.

2. The coupling apparatus as defined in claim 1 further comprising a retaining member received in said recess adjacent said inner end thereof.

3. The coupling apparatus as defined in claim 2 wherein said stiffener includes a radially outward extending flange adapted to engage said retaining member whereby said retaining member, first seal member, and collet retainer move as a unit in the event of an attempted withdrawal of an associated non-metallic pipe end from said body.

4. The coupling apparatus as defined in claim 1 further comprising a nipple threadedly received in said recess outer end for operative engagement with said gasket whereby said gasket is axially and radially compressed in said recess.

5. The coupling apparatus as defined in claim 1 wherein a retaining member is received in said recess adjacent said inner end thereof, said retaining member having a radially inward extending toothed portion defining a first inner diametrical dimension slightly less than a second diametrical dimension of said collet retainer toothed inner surface.

6. The coupling apparatus as defined in claim 1 further comprising a thrust washer and second seal member interposed between said first seal member and collet retainer.

7. A stab-type coupling apparatus comprising:
   a body having opposed first and second ends and a recess of generally constant dimension defined therein;
   an elongated hollow stiffener received in said recess, said stiffener having a generally radially extending flange and a reduced peripheral dimension portion at the other end defining a generally annular cavity with said body recess, said cavity adapted to receive an associated non-metallic pipe end;

a retaining member received in said recess adjacent said stiffener flange;

a first seal member received in said recess adjacent said retaining member, said first seal member adapted for sealing engagement between said body and an associated non-metallic pipe end;

a collet retainer disposed in said recess between said first seal member and said firsst end, said collet retainer having a tapered external surface which converges in the direction of said body first end and a toothed internal surface adapted to engage an associated non-metallic pipe end;

a ring disposed in said recess, said ring having an internal surface generally complementary to said external surface of said collet retainer and against which said collet retainer is adapted to bear in the event of an attempted withdrawal of an associated non-metallic pipe end from said body;

a gasket disposed in said recess between said collet retainer and said first end; and, an adjustable shoulder received in said first end operatively compressing said gasket.

8. The coupling apparatus as defined in claim 7 wherein said retaining member includes a reduced diameter portion adapted to engage an associated non-metallic pipe end.

9. The coupling apparatus as defined in claim 7 further comprising a thrust washer interposed between said first seal member and said collet retainer.

10. The coupling apparatus as defined in claim 7 wherein said body first end and shoulder are threadedly engaged for relative movement therebetween.

11. The coupling apparatus as defined in claim 7 further comprising a second seal member disposed adjacent said first seal member also adapted for sealing engagement between said body and an associated non-metallic pipe end.

12. The coupling apparatus as defined in claim 7 wherein said shoulder is defined on an externally threaded nipple having a first end matingly received in said body first end.

13. A stab-type coupling adapted to receive an associated generally smooth wall non-metallic pipe end therein, the coupling comprising:

a coupling body having a recess of generally constant dimension;

a generally elongated metallic hollow stiffener axially received in said recess and having a reduced dimension portion adapted to be received in an associated non-metallic pipe end;

a retaining member received in said recess having a reduced dimension portion adapted to engage a peripheral portion of an associated non-metallic pipe end;

first and second elastomeric seal rings disposed around said stiffener and adapted for sealing between a peripheral portion of an associated non-metallic pipe end and said coupling body;

a collet retainer disposed in said recess having a generally tapered surface converging toward said stiffener as said collet retainer extends axially outward and having a toothed interior surface adapted to selectively engage a peripheral portion of an associated non-metallic pipe end;

a generally frustoconical member received in said recess having an inclined surface complementary to said collet retainer tapered surface and adapted to selectively advance said collet retainer toward engaging relation with the peripheral portion of the associated non-metallic pipe end;

a gasket received in said recess adjacent said collet retainer and frustoconical member, said gasket and seal rings being disposed on opposite axial sides of said collet retainer; and, means for selectively compressing said gasket whereby said gasket is adapted to engage a peripheral portion of an associated non-metallic pipe end.

14. The coupling as defined in claim 13 further comprising a radial flange extending outwardly from an inner end of said stiffener adapted for abutting engagement with said retaining member.

15. The coupling as defined in claim 13 further comprising a thrust washer interposed between said first seal ring and collet retainer.

* * * * *